United States Patent [19]
Vecht

[11] Patent Number: 5,357,111
[45] Date of Patent: Oct. 18, 1994

[54] PYROELECTRIC DETECTOR APPARATUS

[75] Inventor: Jacob J. Vecht, Jerusalem, Israel

[73] Assignee: Ophir Optronics Ltd., Jerusalem, Israel

[21] Appl. No.: 108,124

[22] Filed: Aug. 17, 1993

[30] Foreign Application Priority Data

Mar. 31, 1993 [IL]  Israel ..................... 105245

[51] Int. Cl.⁵ ........................... H01L 27/146
[52] U.S. Cl. ....................... 250/338.3; 250/338.1
[58] Field of Search ............. 250/338.3, 338.2, 338.1

[56] References Cited

U.S. PATENT DOCUMENTS

| | | | |
|---|---|---|---|
| 4,831,257 | 5/1989 | McClelland et al. | 250/338.3 |
| 4,868,390 | 9/1989 | Keller et al. | 250/338.3 |
| 4,963,741 | 10/1990 | McMullin | 250/338 |
| 5,075,549 | 12/1991 | Pines | 250/338.3 |
| 5,114,228 | 5/1992 | Greenfield et al. | 356/222 |

*Primary Examiner*—Paul M. Dzierzynski
*Assistant Examiner*—Richard Hanig
*Attorney, Agent, or Firm*—Brumbaugh, Graves, Donohue & Raymond

[57] ABSTRACT

Pyroelectric detection apparatus including a pyroelectric detector operative to produce an electric output in response to pulsed incident radiation and a discharge circuit for discharging the electric output. The discharge is operative to impose an effective high impedance on the pyroelectric detector during at least a portion of the duration of each radiation pulse and to impose a low effective resistance during the intervals between the radiation pulses.

26 Claims, 2 Drawing Sheets

PYROELECTRIC DETECTOR APPARATUS

FIELD OF THE INVENTION

The present invention relates to pulsed energy detecting apparatus in general and, more particularly, to pyroelectric detecting apparatus.

BACKGROUND OF THE INVENTION

Pyroelectric detectors have been widely used in the past for detecting pulsed energy radiation and for measuring the peak intensity of such radiant energy. The pyroelectric detector generally includes a pyroelectric crystal having a front surface, through which the incident pulse is received, and a rear surface. When energy is received, a voltage is developed between a terminal on the front face of the detector and a terminal on the rear face of the detector, as described below. One of these terminals is normally grounded and the other supplies a signal to a measuring device. The rear surface is, generally, thermally "grounded" by a heat "sink" which rapidly absorbs the heat energy collected by the crystal during detection.

As is well known in the art, a pyroelectric crystal produces a charge which is proportional to the energy of the incident pulse. This charge is generally converted by the internal capacitance of the crystal into a voltage across the terminals of the crystal which is proportional to the charge. When relatively high energies (in the order of 1 Joule) are to be detected, the internal capacitance of the crystal is insufficient and, therefore, an external capacitor must be connected parallel to the crystal in order to properly convert the charge into voltage. The combined effect of the internal capacitance and the external capacitor will be hereinafter referred to as the total capacitance of the detector.

Normally, it is desirable to detect repetitive radiation events and, therefor, the detector must be rapidly discharged after each detection. If the detector is not completely discharged between consecutive detections, the detector output may be biased by a gradually increasing residual voltage (generally referred to as base-line shift) which reduces the reliability of the pulse-energy measurement. Rapid discharge is normally achieved by discharging the ungrounded terminal of the crystal through a discharge resistor. It is appreciated that the effective detector discharge time is proportional to the RC time constant of the capacitor/discharge resistor combination. Therefore, in order to achieve a high detection repetition rate a relatively low discharge resistance (typically 1 MΩ) discharge resistor should be used.

But when the effective discharge period is very short, the detector may be prematurely discharged, i.e. discharged before the pyroelectric crystal had been charged to the desired peak voltage level. This problem becomes more apparent when the duration of the detected pulses is long compared to the time intervals between pulses. It is appreciated that even when the detected energy pulses are very short, the resultant build-up of charge in the crystal is not immediate because the build-up rate is limited by the rate of diffusion of heat through the detector's front surface and any radiation absorbent material thereon. Therefore, for many practical uses, the discharge resistance cannot be as low as may be desired for high repetition rates.

The typical output pulse from existing pyroelectric detectors is characterized by a sharp rise to a peak voltage followed by an exponential decay to a low voltage. This pattern does not reproduce the wave-shape of the detected energy, due to the discharge method. The typical output of conventional detectors is also characterized by a drifting baseline which becomes more pronounced when the discharge resistance is increased.

There is thus an inherent conflict between the requirements for high detectability which require a very large resistance, fast reset (for high repetition rates) which requires a very low resistance and low interpulse drift which requires an intermediate resistance.

SUMMARY OF THE INVENTION

It is therefore an object of the present invention to provide an improved pyroelectric detector apparatus for detecting energy pulses over a wide range of energies and power levels, at a high repetition rate and with a low drift.

A pyroelectric detecting apparatus constructed and operative in accordance with a preferred embodiment of the present invention includes a pyroelectric detector which produces an electric output in response to pulsed incident radiation and a discharge circuit for discharging the electric output. According to the present invention, the impedance of the discharge circuit is effectively high during at least a portion of the radiation pulse and the impedance of the discharge circuit is effectively low between radiation pulses, until the arrival of the following pulse.

Due to the effectively low impedance of the discharge circuit between pulses, the detector is discharged rapidly and a high detection repetition rate is achieved. In a preferred embodiment of the invention the repetition rate is limited only by the heat diffusion rate of the pyroelectric detector. As a result of the effectively high impedance of the circuit during the pulses, discharge of the detector does not begin before the detector is charged to its peak.

In a first preferred embodiment of the present invention, the discharge circuit includes a relatively low resistance in series with a delay circuit. During the radiation pulse, the delay circuit is operative to delay discharge of the detector by the low resistance of the discharge circuit only after a preselected time period (the delay period of the delay circuit) has passed after the start of the pulse. Between radiation pulses, in contrast, the low resistance is constantly in effect and, therefore, any residual or drift voltage on the detector is efficiently discharged. It should be appreciated that the time constant of typical drift voltage changes (a few milliseconds) is much longer than the delay period (of the order of 100 microseconds or less) introduced by the present invention and, therefor, the delay circuit does not substantially affect the efficient discharge of drift voltages by the low series resistance. This particular embodiment of the invention is suitable for measuring, at a high repetition rate, radiation pulses of up to approximately 20 microseconds length.

In accordance with another preferred embodiment of the invention, the discharge circuit includes a triggered series switch. In its broadest sense, the triggered switch is operative to open the discharge circuit whenever a predetermined condition is met. In a preferred embodiment of the invention, a trigger circuit is operative to determine the presence of a radiation pulse. In one embodiment, the trigger circuit opens the triggered switch for a preselected time period after the detector output voltage reaches a preset trigger condition. According to one aspect of this embodiment, the switch is opened when the amplitude of the voltage wave-pattern reaches a preselected threshold. According to another aspect of this embodiment, the switch is opened when the rate of change of the output voltage reaches a preselected threshold.

In one preferred embodiment of the invention, after the switch has been opened at the start of the pulse, it will remain open for a preselected period of time. Preferably, this period of time is preselected by the user in accordance with the lengths and repetition rates of the pulses being detected. Alternatively, in another preferred embodiment of the invention, the switch is closed by the trigger circuit at the end of the detected pulse. The end of the pulse may be determined, for example, by detection of a sharp drop in the rate of change of the output voltage. In a preferred embodiment of the invention, the trigger circuit includes a comparator.

It should be appreciated that by using the trigger circuit, the discharge circuit may be disconnected for any desired period of time. However, the response of the trigger circuit to the occurrence of a threshold condition is not immediate. Therefore, in a preferred embodiment of the invention, a delay circuit is used together with the trigger circuit. In this preferred embodiment of the invention, the delay circuit delays discharge of the detector until after the trigger circuit opens a series switch, thereby compensating for the reaction time of the trigger circuit.

BRIEF DESCRIPTION OF THE DRAWINGS

The present invention will be better understood from the detailed description of the preferred embodiments taken in conjunction with the following drawings of which.

DETAILED DESCRIPTION OF A PREFERRED EMBODIMENT

Figure 1:
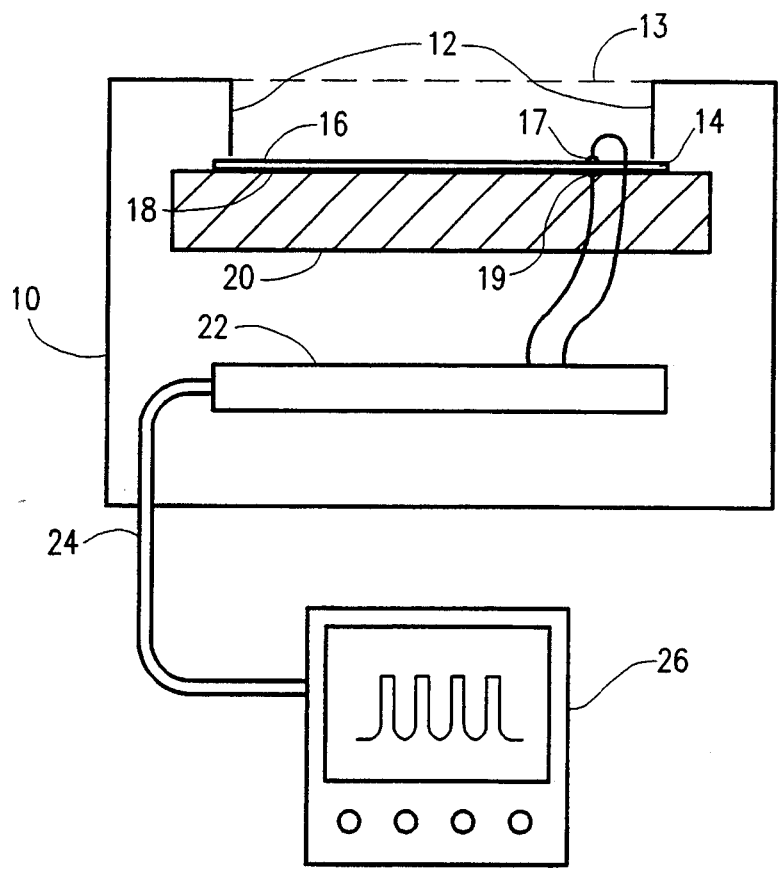
FIG. 1 is a schematic, cross-sectional illustration of pyroelectric detection apparatus in accordance with a preferred embodiment of the invention.

Reference is now made to FIG. 1 which schematically illustrates pyroelectric detection apparatus in accordance with a preferred embodiment of the present invention. The detection apparatus includes a housing 10 which preferably includes an aperture 12 through which radiation to be detected is received. Aperture 12 may be covered by an energy-transmissive cover 13 which protects the detecting apparatus from the external environment. A pyroelectric detector 14 having a front surface 16 and a back surface 18 is located inside housing 10 near aperture 12 such that front surface 16 is at least partially exposed to energy radiated into aperture 12 from a preselected field of view. Surfaces 16 and 18 are electrically connected through terminals 17 and 19, respectively, to pulse-detecting circuitry 22 which is described in detail below with reference to FIG. 2.

In a preferred embodiment of the invention, pyroelectric detector 14 (hereinafter pyro-detector) includes a pyroelectric crystal such as $LiNbO_3$ or any other suitable pyroelectric crystal known in the art. As is well known in the art, pyro-detector 14 is operative to produce electric charge in response to energy pulses which are received through surface 16 and absorbed in the crystal. Due to the internal capacitance of the crystal, or by the aid of an external capacitor (not shown) connected in parallel with terminals 17 and 19, the charge produced in pyro-detector 14 is converted into a voltage across terminals 17 and 19 which is proportional to the charge in the pyro-detector. It is appreciated that the total capacitance (i.e. the combined effect of the internal and external capacitance) of detector 14 is substantially equal to the ratio between the charge on detector 14 and the voltage across terminals 17 and 19. Thus, an external capacitor will generally be used when detecting high energy pulses, in order to avoid high output voltages which may be harmful to the apparatus.

In accordance with a preferred embodiment of the invention, detector 14 is attached, using most of the area of its back surface 18, to a heat sink 20. Heat sink 20 preferably includes a heat-conductive block, such as an anodized aluminum block, which is very massive compared to detector 14. Due to its high heat capacitance and heat conductivity, sink 20 is operative to "pump" heat out of pyrodetector 14 at a very high rate, thereby to prevent deterioration of the pyrodetector's characteristics. In a preferred embodiment of the invention, back surface is 18 is electrically insulated from sink 20 by a heat-conductor which is also an electric non-conductor. An example of such a materials can be found, for example, in U.S. Pat. No. 4,963,741 to Mcmullin, the disclosure of which is incorporated herein by reference.

As mentioned above, surfaces 16 and 18 are electrically connected by terminals 17 and 19 to pulse-detecting circuitry 22. Pulse-detection circuitry 22 is operative to generate an output voltage responsive to the energy pulses detected by detector 14 in a way which will be explained in more detail below with reference to FIG. 2. In a preferred embodiment of the invention, the output voltage is generated from circuitry 22, through output cable 24, to display apparatus 26 which is operative to convert the output voltage into a suitable display. Display apparatus 26 may include any suitable display apparatus known in the art such as, in a preferred embodiment of the invention, the Ophir Nova Handheld Display, available from Ophir Optronics LTD., Jerusalem, ISRAEL. In a preferred embodiment of the invention, display apparatus 26 provides a visual display responsive to the output of detection circuitry 22. More specifically, display 26 may visually display the shape of the detected pulses on a screen, such as a television screen, or it may digitally display a reading corresponding to preselected characteristics of the detected pulse. Preferably, the display on display 26 is proportional to the energy of the detected pulse rather than to the power of the pulse.

Figure 2:
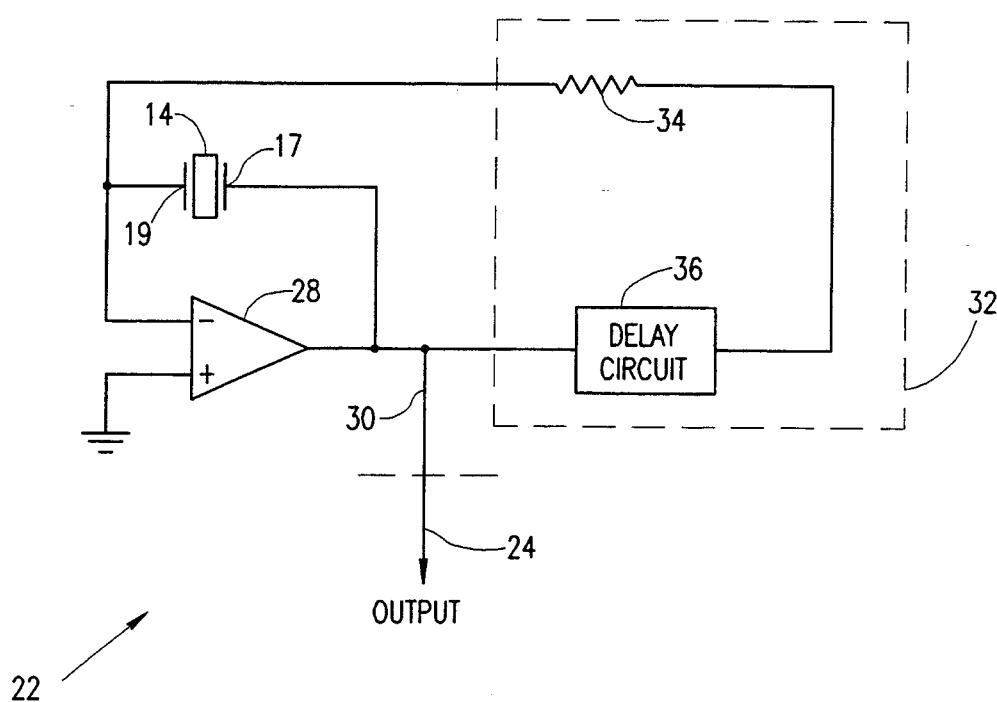
FIG. 2 is schematic illustration of pulse-detection circuitry useful for the operation of the pyroelectric detection apparatus of FIG. 1, in accordance with a first, preferred, embodiment of the present invention.

Reference is now made to FIG. 2, which schematically illustrates one preferred embodiment of pulse-detection circuitry 22. As can be seen in FIG. 2, terminal 19 of pyrodetector 14 is preferably connected to the negative input terminal of an operational amplifier 28, while the other input of amplifier 28 is preferably grounded. Terminal 17 of pyrodetector 14 is preferably connected to the output terminal of amplifier 28 and to a circuit output line 30. It should be appreciated by persons skilled in the art that such an arrangement creates a "virtual ground" at terminal 19, i.e. the potential on terminal 19 is maintained substantially equal to zero. Thus, the voltage on terminal 17, on which the output voltage of circuitry 22 is based, is substantially proportional to the charge on detector 14. In a preferred embodiment of the invention, circuit output line 30 includes output amplifiers or buffers (not shown) which control the output voltage of circuit 22. Specific amplifiers/buffers are chosen, in accordance with the energy levels typically measured by the detection apparatus, such that the output of circuit 22 will be within a desired voltage range.

A preferred embodiment of the invention further includes a discharge circuit 32 connected generally in parallel with detector 14, preferably across terminals 17 and 19. Discharge circuit 32 is operative to selectively discharge pyrodetector 14, between radiation pulses, preferably through a discharge resistor 34 having a relatively low resistance which is preferably in the order of 100 KΩ. During radiation pulses, in contrast, discharge circuit 32 imposes an effectively high impedance parallel to detector 14, thereby preventing discharge of the pyrodetector during detection and measurement of radiation pulses. In a preferred embodiment of the invention, the resistance imposed by resistor 34 is very low compared to prior art detection apparatus and, therefore, the effective discharge period (i.e. a low RC constant) is considerably shorter. It is a particular feature of an embodiment of the present invention that detector 14 is not prematurely discharged (i.e. not discharged before the pyroelectric crystal had been charged to a desired peak voltage level) in spite of the short discharge period, as described in detail below.

In series with discharge resistor 34, discharge circuit 32 preferably further includes a delay circuit 36 which is operative to delay the discharge of pyrodetector 14 by a preselected time period, hereinafter referred to as the delay period. By virtue of delay circuit 36, the flow of charge from back surface 18 of the pyrodetector to its front surface 16, through resistance 34, is delayed by the preselected delay period imposed by the delay circuit. After a radiation pulse has been detected, the low resistance 34 of discharge circuit 32 is activated, in effect, only at the end of the preset delay period. It is appreciated that discharge of detector 14 is also delayed during inter-pulse intervals but, since voltage changes in the inter pulse intervals are generally moderate and slow, the effect of delay in these intervals is negligible and quickly corrected.

It should be appreciated that the time constant of typical drift voltage changes (a few milliseconds) is much longer than the delay period (which, optimally, is in the order of 100 microseconds or less) introduced by the analog delay circuit of the present invention and, therefore, the efficient discharge of drift voltages through discharge resistor 34 is substantially unaffected by the delay period.

Figure 3:
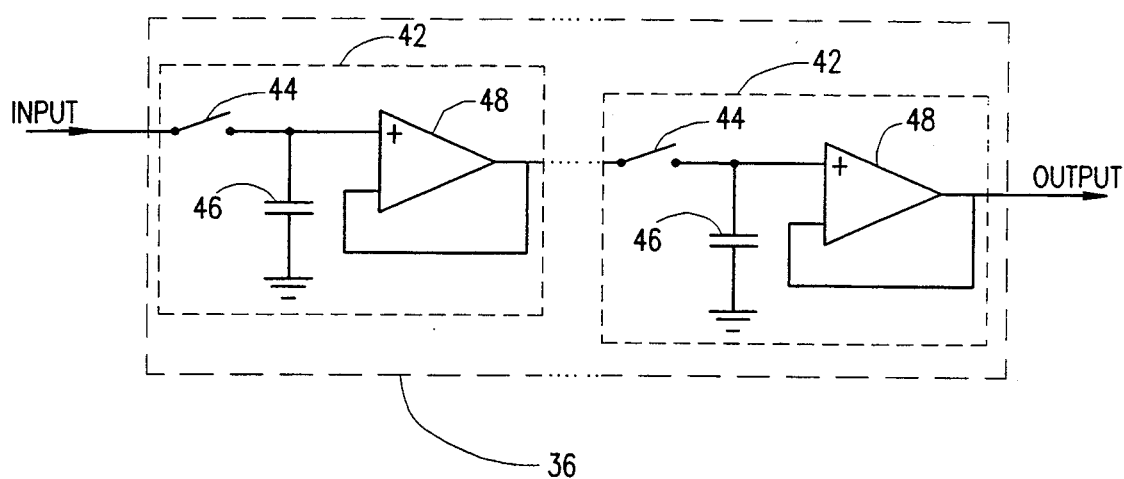
FIG. 3 is a schematic illustration of a preferred analog delay circuit for the detection circuitry of FIG. 2.

Reference is now made to FIG. 3 which schematically illustrates preferred circuitry of analog delay circuit 36. In a preferred embodiment of the invention, delay circuit 36 includes a plurality of "sample-and-hold" (S/H) sections 42. Each S/H section preferably includes a timed-switch 44, a capacitor 46 and an operational amplifier 48. In a preferred embodiment of the invention, switch 44 is switched on and off periodically at a preselected rate, such that the switch remains closed for a preselected "sample" period followed by a preselected "hold" period during which switch 44 is open. During the "sample" period, capacitor 46 is charged to a voltage substantially equal to the input from switch 44. The voltage on capacitor 46 will remain substantially constant, during the "hold" period, due to the high input impedance of amplifier 48 which is used as a buffer. It will be appreciated by persons skilled in the art that by connecting two or more such S/H sections 42 in series and by controlling the operation of their switches 44, any desired delay period can be obtained. For example, when switches 44 of two successive S/H sections 42 are closed during alternating intervals, separated by a preselected phase-shift, signals at the input of circuit 36 will be reproduced at the output of circuit 36 only after a delay period, equal to at least the preselected phase-shift, has passed.

It should be appreciated that delay circuit 36 may alternatively include any other delay electronics known in the art. In one embodiment of the invention, the analog delay circuit includes a "bucket-brigade" delay line which essentially includes a one-dimensional charged coupled device (CCD). In another embodiment of the invention, circuit 36 includes a multi-stage low-pass-filter (LPF) comprising a series of inductors and shunt capacitors. In yet another embodiment, delay circuit 36 includes a coil of electric or fiber-optic cable. Alternatively, delay circuit 36 may include a combination of a digital delay circuit (e.g. FIFO) and a digital to analog converter. Any of the above methods, none of which are shown in the Figs., may be used as well as any other delay circuit known in the art.

Reference is again made to FIG. 2. Since premature discharge of detector 14 is prevented by the present invention when the delay period is properly adapted to the radiation periods of the pulses to be detected, it might be thought that there is no lower limit for the resistance of resistor 34. However, it has been found by the inventors of the present invention, that the discharge resistance is in fact limited. More specifically, it has been found that if the discharge time constant (RC) is set to be shorter than the delay period, discharge circuit 32 may oscillate causing undesirable instabilities in pulse-detection circuitry 22. Nevertheless, this particular embodiment of the invention is suitable for detecting and measuring, at an unprecedented high repetition rate, radiation pulses up to approximately twenty microseconds long. More specifically, a repetition rate of approximately 10 KHz has been achieved experimentally, by the present inventor, when a delay period of approximately 12 (±6) microseconds and an RC time-constant of approximately 30 microseconds were used. The maximum pulse-length properly detected by this embodiment of the invention will be hereinafter referred to as the maximum-delay-period-limitation.

Figure 4:
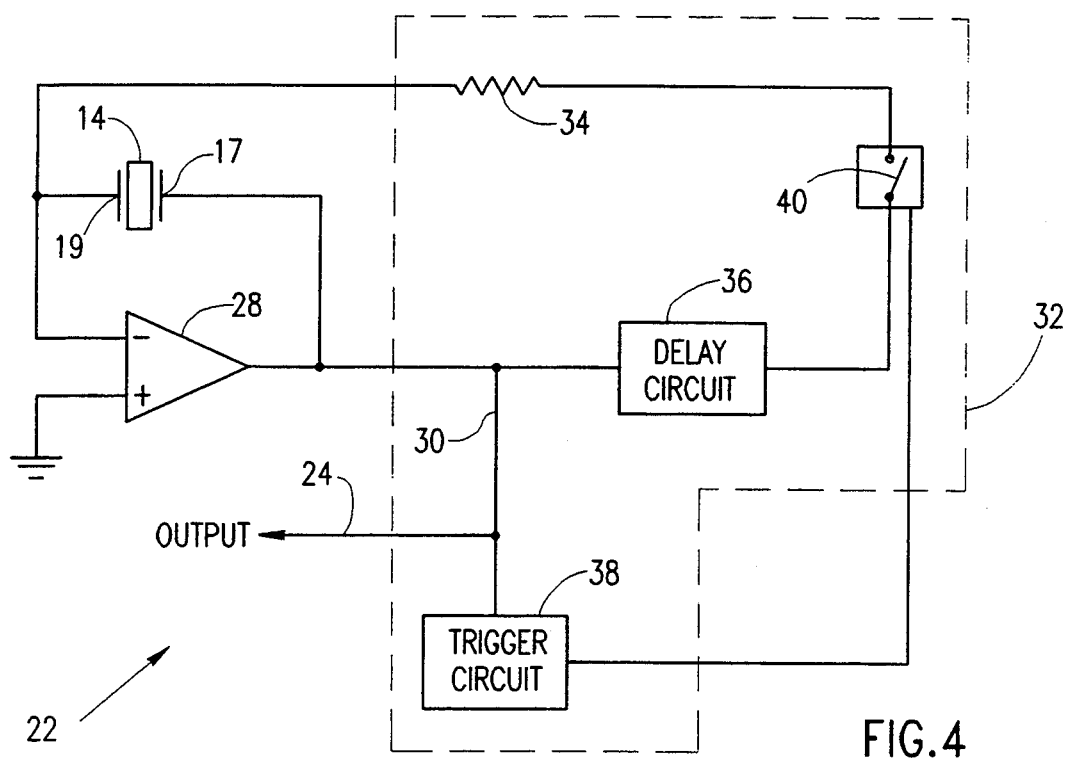
FIG. 4 is a schematic illustration of pulse-detection circuitry useful for the operation the pyroelectric detection apparatus of FIG. 1, in accordance with a second, preferred, embodiment of the present invention.

Reference is now made to FIG. 4, which schematically illustrates another, particularly preferred, embodiment of detection circuitry 22. It will be appreciated that all of the features of circuitry 22 described above, with reference to FIGS. 2 and 3, are also included in the embodiment of FIG. 4. However, the preferred embodiment of FIG. 4 includes additional features which will now be described. In accordance with this preferred embodiment of the present invention, discharge circuit 32 further includes a trigger circuit 38 operative to open an electronic switch 40 which is connected in series with delay circuit 36 and discharge resistor 34 in response to a predetermined trigger condition.

In a preferred embodiment of the invention, trigger circuit 38 opens switch 40 only when an actual radiation pulse is detected. According to a preferred embodiment of the invention, trigger circuit 38 opens switch 40 when the voltage across detector 14 reaches a preset trigger condition. According to one aspect of this embodiment, switch 40 is opened when the amplitude of the voltage across detector 14 reaches a preselected threshold level. According to another aspect of this embodiment, discharge circuit 32 is opened when the rate of change of the voltage across detector 14 reaches a preselected level. As can be seen in FIG. 4, the voltage across detector 14 is preferably supplied to trigger circuit 38, from front terminal 17, via output line 30.

In one preferred embodiment of the invention, after discharge circuit 32 has been opened at the start of a triggering pulse (i.e. a pulse which meets with either of the trigger conditions described above), it will remain open for a preselected period of time (hereinafter referred to as freeze period). The freeze period may be user-selected and, preferably, the period is chosen in accordance with the lengths and repetition rates of the specific radiation pulses to be detected. In a preferred embodiment of the invention, the freeze-period is selected by virtue of a freeze-select multi-mode switch (not shown) on display apparatus 26 (FIG. 1).

In another preferred embodiment of the invention, discharge circuit 32 is closed by trigger circuit 38 at the end of the detected pulse. According to this preferred embodiment, the end of the pulse is determined by a sharp drop in the rate of change of the output voltage across terminals 17 and 19 of detector 14 (hereinafter the untrigger condition). In a preferred embodiment of the invention, trigger circuit 38 includes at least two comparators (not shown), one for triggering the freeze-period and one for untriggering the circuit (i.e. closing switch 40). As is well known in the art, each of the comparators is operative to compare the voltage across the pyrodetector with the preselected trigger or untrigger condition, as appropriate. Other suitable methods known in the art for triggering switch 40 in response to the preselected conditions may equally well be used.

It should be appreciated that by including trigger circuit 38 in discharge circuit 32, the discharge circuit may be opened for any desired period of time after a radiation pulse has been detected. Therefore, the maximum-delay-period limitation mentioned above is completely avoided by using trigger circuit 38. However, the response of trigger circuit 38 to the trigger conditions is generally not immediate. It is thus preferable, although not absolutely required, to use delay circuit 36 in conjunction with trigger circuit 38. Circuit 36 thus delays the discharge of pyrodetector 14 until after trigger circuit 38 opens switch 40, thereby compensating for the reaction time of the trigger circuit.

It should be appreciated that the pulse detection apparatus described hereinabove is capable of detecting radiation pulses having much higher repetition rates and much longer pulse-durations than any pyroelectric pulse-detection apparatus known in the art. Also, it should be appreciated that the shape of the detected energy pulses (even long pulses) is approximately reproduced in the output of the novel pulse detection apparatus described herein, in contrast to prior art detection apparatus, due to the controlled discharge of the pyrodetector.

It will be appreciated by persons skilled in the art that the present invention is not limited to what has been thus far described but, rather, the scope of the present invention is limited only by the following claims:

I claim:

1. Pyroelectric detection apparatus comprising:
   a pyroelectric detector operative to produce an electric output in response to pulsed incident radiation; and
   a discharge circuit for discharging the electric output operative to impose an effective high impedance on the pyroelectric detector during at least a portion of the duration of each radiation pulse and to impose a low effective resistance during the intervals between the radiation pulses.

2. Apparatus according to claim 1 wherein the discharge circuit comprises a delay circuit operative to delay passage of electric current through the discharge circuit by a preselected delay period.

3. Apparatus according to claim 1 wherein the discharge circuit comprises a discharge resistor operative to impose the effective low resistance.

4. Apparatus according to claim 2 wherein the discharge circuit further comprises a discharge resistor operative to impose the effective low resistance.

5. Apparatus according to claim 1 wherein the discharge circuit comprises a trigger circuit operative to open the discharge circuit each time the output produced by the pyroelectric detector reaches a preselected trigger condition and to maintain the discharge circuit open for a preselected time period after the trigger condition has been reached.

6. Apparatus according to claim 1 wherein the discharge circuit comprises a trigger circuit operative to open the discharge circuit each time the output produced by the pyroelectric detector reaches a preselected first, trigger, condition and to maintain the discharge circuit open until the output produced by the pyroelectric detector reaches a preselected second, untrigger, condition.

7. Apparatus according to claim 2 wherein the discharge circuit further comprises a trigger circuit operative to open the discharge circuit each time the output produced by the pyroelectric detector reaches a preselected trigger condition and to maintain the discharge circuit open for a preselected time period after the trigger condition has been reached.

8. Apparatus according to claim 2 wherein the discharge circuit further comprises a trigger circuit operative to open the discharge circuit each time the output produced by the pyroelectric detector reaches a preselected first, trigger, condition and to maintain the discharge circuit open until the output produced by the pyroelectric detector reaches a preselected second, untrigger, condition.

9. Apparatus according to claim 3 wherein the discharge circuit further comprises a trigger circuit operative to open the discharge circuit each time the output produced by the pyroelectric detector reaches a preselected trigger condition and to maintain the discharge circuit open for a preselected time period after the trigger condition has been reached.

10. Apparatus according to claim 3 wherein the discharge circuit comprises a trigger circuit operative to open the discharge circuit each time the output produced by the pyroelectric detector reaches a preselected first, trigger, condition and to maintain the discharge circuit open until the output produced by the pyroelectric detector reaches a preselected second, untrigger, condition.

11. Apparatus according to claim 4 wherein the discharge circuit further comprises a trigger circuit operative to open the discharge circuit each time the output produced by the pyroelectric detector reaches a preselected trigger condition and to maintain the discharge circuit open for a preselected time period after the trigger condition has been reached.

12. Apparatus according to claim 4 wherein the discharge circuit further comprises a trigger circuit operative to open the discharge circuit each time the output produced by the pyroelectric detector reaches a preselected first, trigger, condition and to maintain the discharge circuit open until the output produced by the pyroelectric detector reaches a preselected second, untrigger, condition.

13. Pyroelectric detection apparatus comprising:
a pyroelectric detector, operative to produce an electric output across first and second surface terminals thereof, in response to pulsed radiation incident thereon; and
a resistor and a delay circuit in series connection, the series connection being connected substantially in parallel with the pyroelectric detector.

14. Apparatus according to claim 13 and further comprising:
an operational amplifier having a first input terminal connected to the first surface terminal, a second input terminal which is grounded and an output terminal connected to the second surface terminal.

15. Pyroelectric detection apparatus comprising:
a pyroelectric detector, operative to produce an electric output across first and second surface terminals thereof, in response to pulsed radiation incident thereon;
a resistor and a switch in series connection, the series connection being connected substantially in parallel with the pyroelectric detector; and
a trigger circuit, operative to open the switch in response to the presence of the electric output.

16. Apparatus according to claim 15 wherein the trigger circuit is operative to open the switch each time the output across the first and second surface terminals reaches a preselected first, trigger, condition and to maintain the discharge circuit open until the output produced by the pyroelectric detector reaches a preselected second, untrigger, condition.

17. Apparatus according to claim 15 wherein the trigger circuit is operative to open the switch each time the output across the first and second surface terminals reaches a preselected first, trigger, condition and to maintain the discharge circuit open for a preselected time period after the trigger condition has been reached.

18. Apparatus according to claim 15 and further comprising:
an operational amplifier having a first input terminal connected to the first surface terminal, a second input terminal which is grounded and an output terminal connected to the second surface terminal.

19. Apparatus according to claim 16 and further comprising:
an operational amplifier having a first input terminal connected to the first surface terminal, a second input terminal which is grounded and an output terminal connected to the second surface terminal.

20. Apparatus according to claim 17 and further comprising:
an operational amplifier having a first input terminal connected to the first surface terminal, a second input terminal which is grounded and an output terminal connected to the second surface terminal.

21. Apparatus according to claim 15 and further comprising:
a delay circuit in series connection with the resistor and the switch.

22. Apparatus according to claim 16 and further comprising:
a delay circuit in series connection with the resistor and the switch.

23. Apparatus according to claim 17 and further comprising:
a delay circuit in series connection with the resistor and the switch.

24. Apparatus according to claim 18 and further comprising:
a delay circuit in series connection with the resistor and the switch.

25. Apparatus according to claim 19 and further comprising:
a delay circuit in series connection with the resistor and the switch.

26. Apparatus according to claim 20 and further comprising:
a delay circuit in series connection with the resistor and the switch.

* * * * *